(12) United States Patent
Goto

(10) Patent No.: US 6,170,693 B1
(45) Date of Patent: Jan. 9, 2001

(54) DRINKING RECEPTACLE

(75) Inventor: Toru Goto, Tokyo (JP)

(73) Assignee: Nippon Sanso Corporation, Tokyo (JP)

(*) Notice: Under 35 U.S.C. 154(b), the term of this patent shall be extended for 0 days.

(21) Appl. No.: 09/321,615

(22) Filed: May 28, 1999

(30) Foreign Application Priority Data

Jun. 2, 1998 (JP) .................................................. 10-153130

(51) Int. Cl.⁷ .................................................. A47G 19/22
(52) U.S. Cl. ...................... 220/592.17; 220/256; 220/713
(58) Field of Search ........................ 220/592.17, 592.16, 220/592.22, 592.26, 592.27, 254, 256, 288, 703, 711, 713, 714, 716, 719, 62.12; 215/13.1, 12.1, 10, 387, 329, 356

(56) References Cited

U.S. PATENT DOCUMENTS

| | | | |
|---|---|---|---|
| 5,253,780 | * 10/1993 | Adado ................................. | 220/711 |
| 5,456,380 | * 10/1995 | Ito et al. .............................. | 220/713 |
| 5,477,979 | * 12/1995 | Goessling et al. ................... | 220/713 |
| 5,680,951 | * 10/1997 | Feltman, III et al. ............... | 220/713 |
| 5,918,761 | * 7/1999 | Wissinger ............................ | 220/713 |

FOREIGN PATENT DOCUMENTS 7-251854   10/1995   (JP) .

* cited by examiner

Primary Examiner—Nathan J. Newhouse
(74) Attorney, Agent, or Firm—Armstrong, Westerman, Hattori, McLeland & Naughton

(57) ABSTRACT

The drinking receptacle has excellent portability and is free from deposition of dusts on and around the drinking spout. An inner cover 3 applied to the top of a receptacle main body 2 which has heat insulation function and an outer cover 4 applied to the inner cover are sealed from each other with a water-sealing structure. The inner cover 3 has, on its cover plate 31 covering the upper opening of the receptacle main body 2, a drinking spout 34 and an air vent 35.

3 Claims, 4 Drawing Sheets

DRINKING RECEPTACLE

BACKGROUND OF THE INVENTION

The present invention relates to a drinking receptacle consisting essentially of a receptacle main body having heat-insulating function and an inner cover which has a drinking spout and which is to be applied to the top of the receptacle main body.

DESCRIPTION OF THE RELATED ART

A metallic drinking receptacle disclosed, for example, in Japanese Unexamined Patent Publication No. 251854/1995 consists essentially of a receptacle main body having an inner shell, an outer shell and a heat-insulating section defined between the !inner shell and the outer shell; and a cover which has a drinking spout and which is removably applied to the top of the receptacle main body. This cover has a cover plate which covers an upper opening of the receptacle main body and a side wall formed to surround the cover plate, with a drinking spout and an air vent being defined in the cover plate.

However, since the drinking spout and the air vent are normally unclosed, a drink in the receptacle spills out unless the drinking receptacle is carried upright, making it inconvenient to carry with. Further, since the drinking spout is uncovered, dusts and the like readily deposit on and around it. In addition, since air and the like flow in and out through the drinking spout and air vent, and since the cover has no heat-insulating function, it is difficult to maintain the temperature of the drink in the drinking receptacle.

SUMMARY OF THE INVENTION

It is an objective of the present invention to provide a drinking receptacle which has excellent portability and is free from deposition of dusts and the like on its cover having a drinking spout and which has improved heat-insulating. performance.

The drinking receptacle according to the present invention consists essentially of a receptacle main body containing an inner shell, an outer shell and a heat-insulating section defined between the inner shell and the outer shell; and an inner cover to be removably applied to the top of the receptacle main body. The inner cover has a drinking spout on its cover plate covering the upper opening of the receptacle main body, and an outer cover is removably applied to the inner cover to cover the cover plate. The outer cover and the inner cover are sealed from each other by a water-sealing structure.

Accordingly, the drinking receptacle is convenient to carry with since the water-sealing structure prevents the drink from spilling out even if the drinking receptacle is tilted in any direction. Further, since the cover plate is covered with the outer cover unless the drink is to be drunk, the drinking receptacle is hygienic with no deposition of dusts and the like on and around the drinking spout.

Meanwhile, if the cover plate is tilted, it allows the drink flowed out onto the upper surface of the cover plate to return through the drinking spout located at the lower side of the tilted cover plate into the receptacle main body, when the drinking receptacle is set upright, to leave no drink on the upper surface of the cover plate.

If the outer cover has heat-insulating function, the temperature of the drink in the receptacle can be maintained to give high heat-insulating performance.

Other aspects and advantages of the invention will become apparent from the following description, taken in conjunction with the accompanying drawings illustrated by way of examples the principles of the invention.

BRIEF DESCRIPTION OF THE DRAWINGS

The invention together with the objects and advantages thereof, may best be understood by reference to the following description of the presently preferred embodiments together with the accompanying drawings in which.

DETAILED DESCRIPTION OF THE PREFERRED EMBODIMENTS

Figure 1:
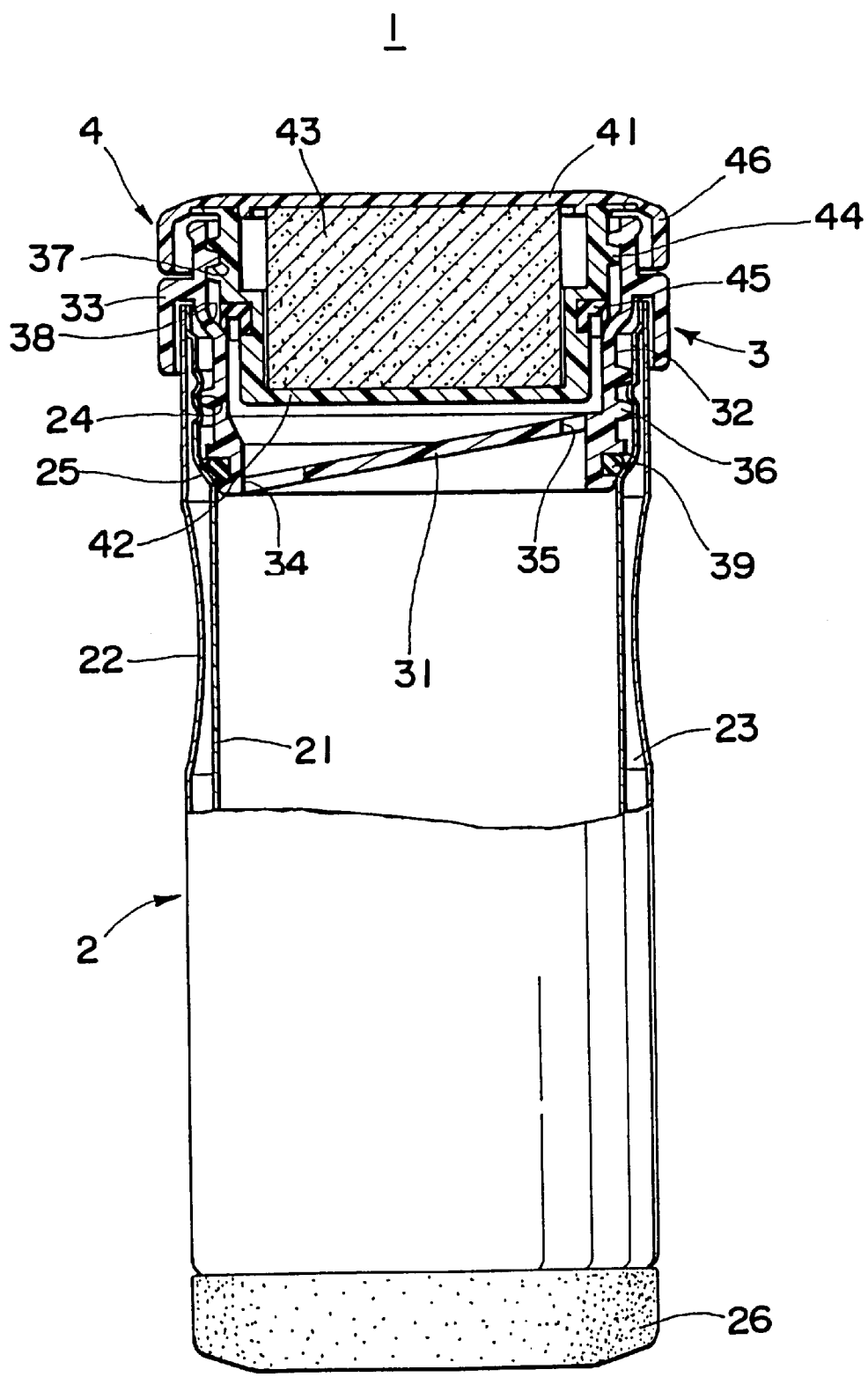
FIG. 1 is a partial cross-sectional view of the drinking receptacle according to a first embodiment of the present invention.
Figure 2:
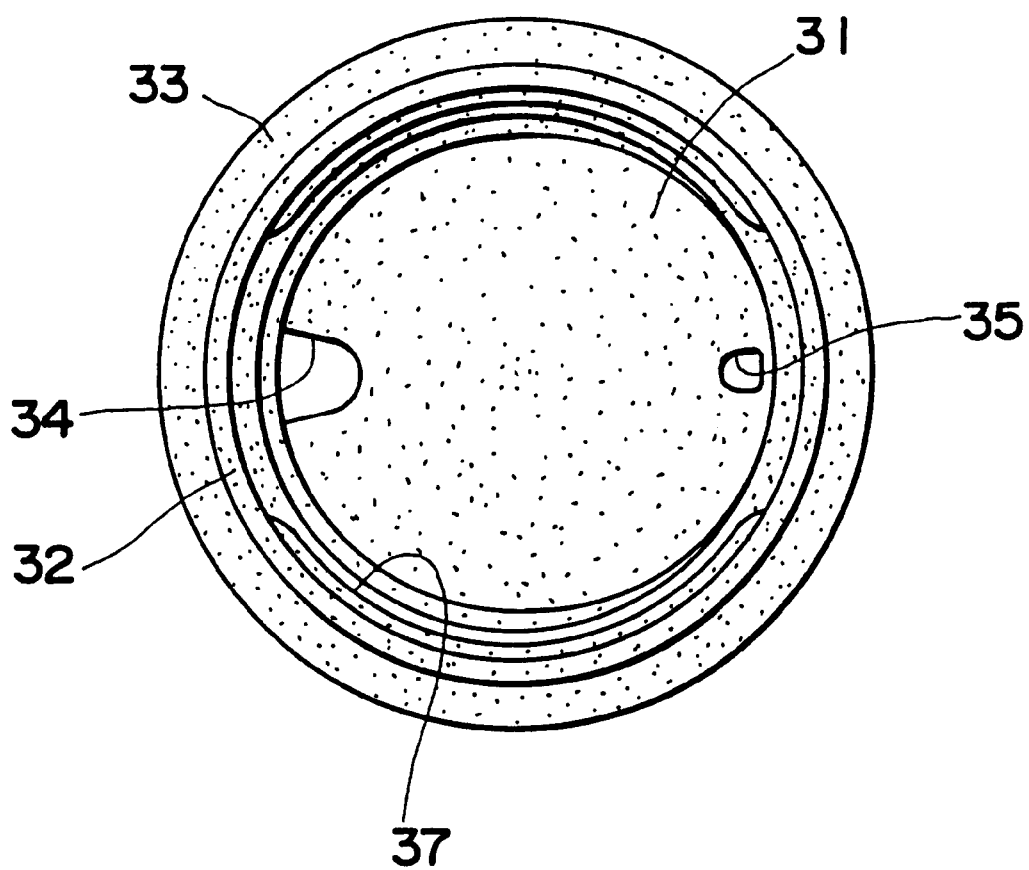
FIG. 2 is a plan view showing the inner cover according to the first embodiment.

Embodiments of the present invention will be described below more specifically referring to the drawings. FIGS. 1 and 2 show a first embodiment of the present invention.

A drinking receptacle 1 consists essentially of a receptacle main body 2 having a heat-insulating structure, an inner cover 3 removably applied to the top of the receptacle main body 2 and an outer cover 4 to be removably applied to the inner cover 3.

The receptacle main body 2 is formed by joining a metallic inner shell 21 and a metallic outer shell 22 at their upper ends, and a heat-insulating section 23 having a vacuum heat-insulating structure is defined between the inner shell 21 and the outer shell 22. A threaded portion 24 to which the inner cover 3 is screw-fitted and a step 25 are formed on the inner upper circumference of the inner shell 21 and below the threaded portion 24, respectively. Further, a bottom part 26 is attached to the bottom of the outer shell 22.

The inner cover 3 has a cover plate 31 for covering an upper opening of the receptacle main body 2, a side wall 32 formed to surround the cover plate 31 and a covering portion 33 located slightly upper than the middle portion of the side wall 32 to cover portions continuously from the edge of the receptacle main body 2 to the upper circumferential portion of the outer shell 22. The cover plate 31 is tilted with respect to the axis of the side wall 32 and has a drinking spout 34 and an air vent 35 formed on the lower side and on the higher side respectively. The side wall 32 has on the outer lower circumference a threaded portion 36 to be screw-fitted to the threaded portion 24 and on the inner upper circumference a threaded portion 37 to be engaged with the outer cover 4, and a step 38 at a position lower than the threaded portion 37, with a gasket 39 being applied to the outer lower circumference to be brought into intimate contact with the step 25.

The outer cover 4 has a top plate 41, a stopper 42 to be inserted to the space defined by the side wall 32 of the inner cover 3 and a heat insulating material 43 such as of expanded urethane to be inserted into the space between the top plate 41 and the stopper 42. The stopper 42 has on the outer upper circumference a threaded portion 44 to be screw-fitted to the threaded portion 37 and, at a position lower than the threaded portion 44, a gasket 45 to be brought into intimate contact with the step 38. The top plate 41 has a side wall 46 which covers the outer upper circumference of the side wall 32 of the inner cover 3.

Accordingly, by screw-fitting the inner cover 3 to the receptacle main body 2 containing a drink, the gasket 39 of the inner cover 3 is brought into intimate contact with the step 25 of the receptacle main body 2. Meanwhile, by screw-fitting the outer cover 4 to the inner cover 3, the gasket 45 of the outer cover 4 i s brought into intimate contact with the step 38 of the inner cover 3. The water-sealing structure formed by the intimate contact with the gaskets 39 and 45 prevents the drink from spilling out of the drinking spout 34 or air vent 35, even if the drinking receptacle 1 is turned over or inverted.

Further, even if the drink flows out onto the upper surface of the cover plate 31, it is caused to drop back into the receptacle main body 2 through the drinking spout 34 located at the lower side of the tilted cover plate 31 not to remain on the upper surface of the cover plate 31 by setting the drinking receptacle 1 upright. In addition, since the inner cover 3 is cover ed with the outer cover 4 unless the drink in the receptacle 1 is to be drunk, no dust etc. deposits on and around the drinking spout 34. The outer cover 4 having heat-insulating function can maintain the temperature of the drink contained in the receptacle main body 2 for an extended period. Particularly, by locating the lower surface of the stopper 42 at the proximity of the upper surface of the cover plate 31, the heat insulating material 43 can be allowed to be present in a part lower than the upper opening of the receptacle main body 2, providing more excellent heat insulating property.

Figure 3:
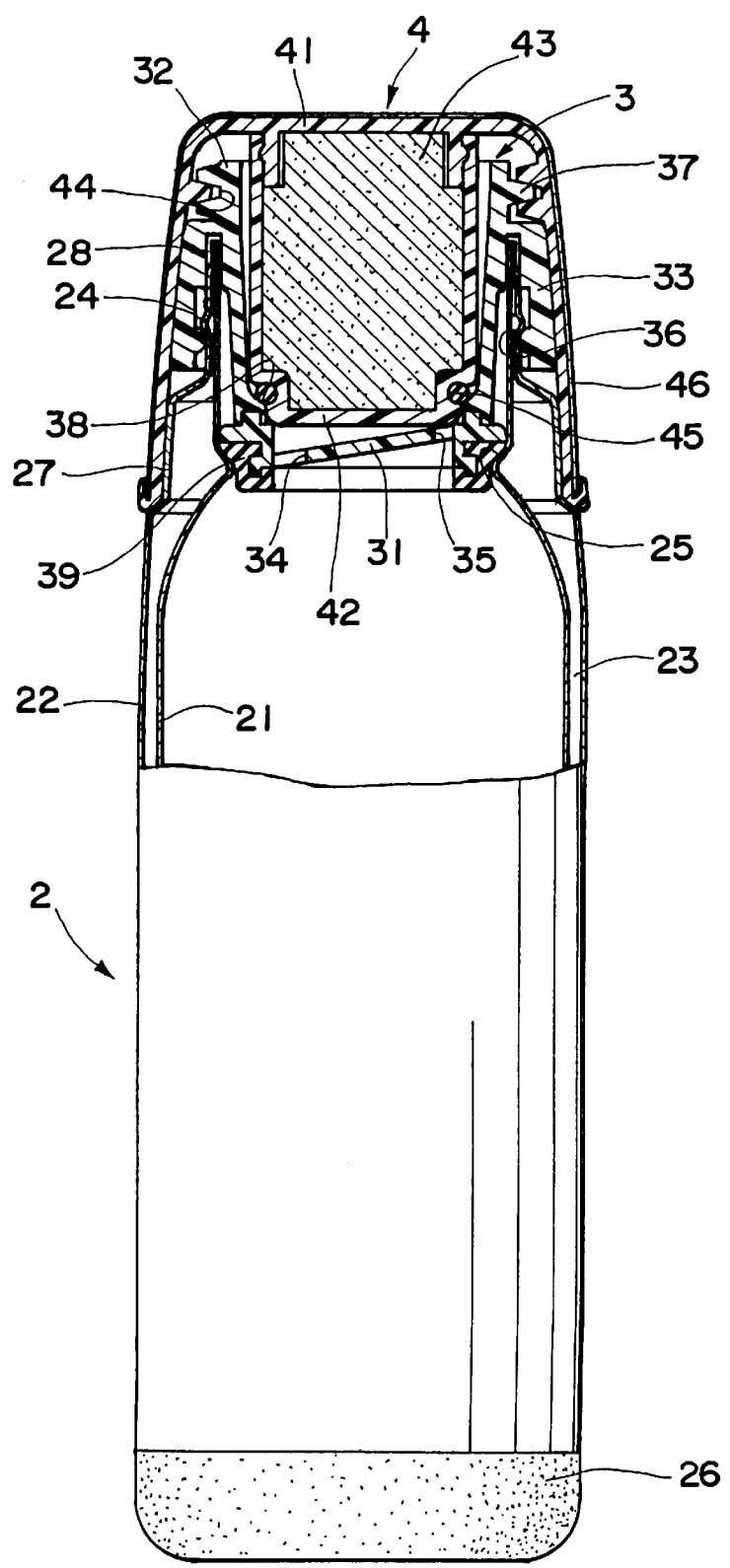
FIG. 3 is a partial cross-sectional view of the drinking receptacle according to a second embodiment of the present invention.

FIG. 3 shows a second embodiment of the present invention. In this embodiment, the same or like components are affixed with the same reference numbers as in the first embodiment respectively, and detailed description of them will be omitted.

In the drinking receptacle 1 according to this embodiment, the side wall 46 of the top plate of the outer cover 4 is formed by extending downward the counterpart in the first embodiment to produce an appearance of integrity with the barrel of the outer shell 22 of the receptacle main body 2 so that the side wall 46 may be continuous with the barrel of the outer shell 22 when the outer cover 4 is applied to the inner cover 3.

In other words, the barrel of the outer shell 22 of the receptacle main body 2 is reduced gradually upward from the middle part to form on its shoulder a neck 27 on which the side wall 46 is fitted. A cylindrical portion 28 having a reduced diameter is formed at a position upper than the neck 27 with a threaded portion 24 being formed on the outer circumference of the cylindrical portion 28. The inner cover 3 is designed to be screw-fitted to this threaded portion 24.

The inner cover 3 has on the inner circumference of the covering portion 33 a threaded portion 36 to be screw-fitted to the threaded portion 24 and on the outer upper circumference of the covering portion 33 a threaded portion 37 to be screw-fitted to the outer cover. The outer cover 4 has on the inner upper part of the side wall 46 a threaded portion 44 to be engaged with the threaded portion 37. The outer diameter of the side wall 46 is reduced gradually upward to form a shape continuous from the outer shell 22.

According to this constitution, the drinking receptacle of the second embodiment not only exhibits the effects like in the first embodiment but also has a sophisticated design, since the barrel of the outer shell 22 and the barrel of the outer cover together c on stitute an even and continuous streamline shape which reduces gradually upward.

Figure 4:
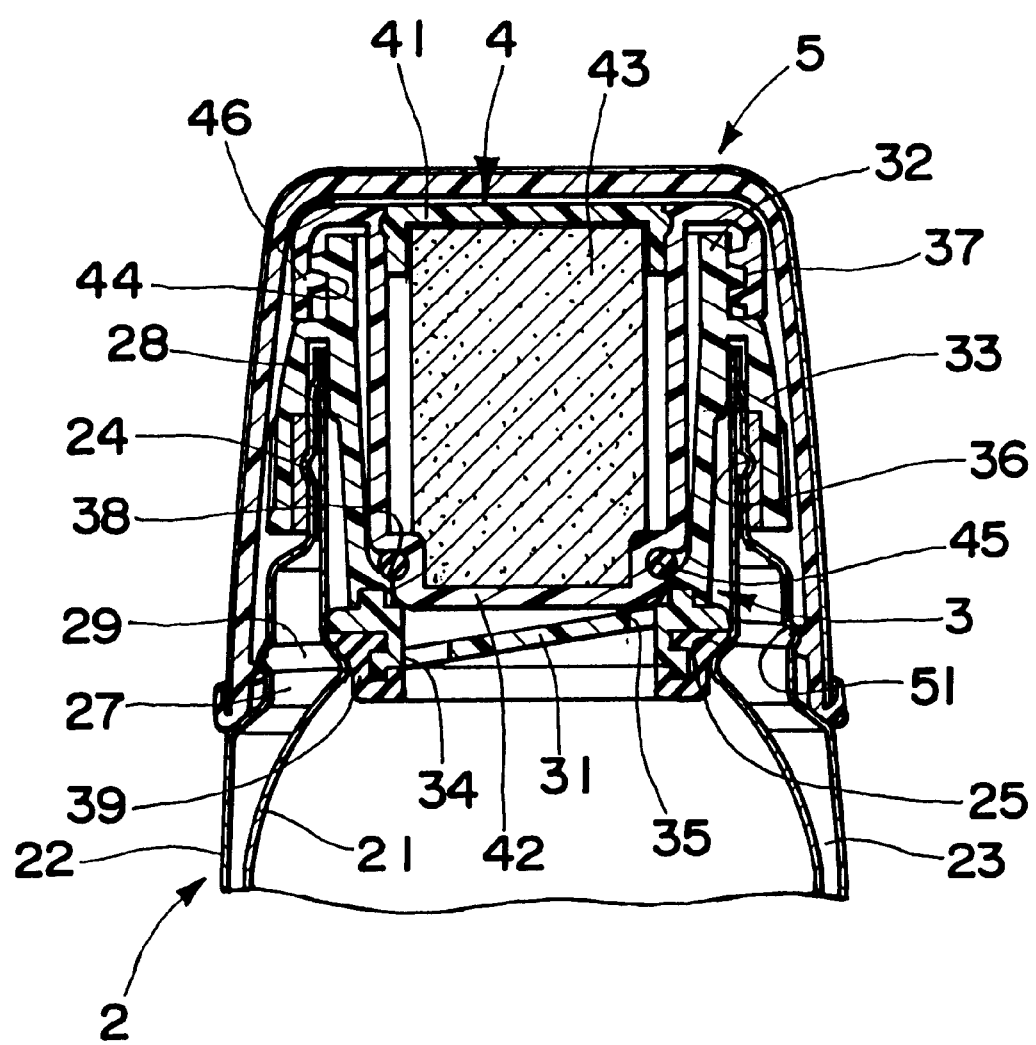
FIG. 4 is a partial cross-sectional view showing the pertinent portion of the drinking receptacle according to the third embodiment of the present invention.

FIG. 4 shows a third embodiment of the present invention. In this embodiment, the same and like elements as in the first and second embodiments are affixed with the same reference numbers respectively, and detailed description of them will be omitted. The drinking receptacle 1 in this embodiment is of a constitution provided with a cup 5 for covering the inner cover 3 and the outer cover 4.

The outer shell 22 of the receptacle main body 2 has on the outer circumference of the neck 27 a threaded portion 29 on which the cup 5 is to be screw-fitted. The side wall 46 of the outer shell 4 covers the outer upper circumference of the side wall 32 of the inner cover 3 like in the first embodiment and has on the inner circumference a threaded portion 44 to be screw-fitted to the threaded portion 37.

The cup 5 is reduced gradually upward such that its barrel and the outer shell 22 form a continuous shape and has on the inner barrel circumference a threaded portion 51 to be screw-fitted to the threaded portion 29.

According to this constitution, the drinking receptacle not only exhibits the effects like in the first embodiment but also enables drinking of a drink poured through the drinking spout 34 into the cup 5. Further, the inner cover 3 and the outer cover 4 can be covered with the cup 5. In addition, the drinking receptacle 1 has a sophisticated design, since the barrel of the outer shell 22 and the barrel of the cup 5 together constitute an even and continuous streamline shape which reduces gradually upward.

It should be noted here that, while the receptacle main bodies 2 explained in the above embodiments are of metals, they may be of a synthetic resin, glass, etc. Further, while the vacuum heat insulating structure is employed for the heat insulating section of each receptacle main body 2, and expanded urethane and the like is used as the heat insulating material in the outer cover 4, these heat insulating structure and material may not be limited to them, but other heat insulating means packed with an inorganic compound such as perlite or with a low thermal conductivity gas such as xenon, krypton, argon, etc. may be employed. In addition, the slant cover plate 31 may have the air vent on the lower side and the drinking spout on the higher side.

Although only a few embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A drinking receptacle, comprising:
   a receptacle main body having an inner shell, an outer shell and a heat insulating section defined between the inner shell and the outer shell;
   an inner cover to be removably applied to the top of the receptacle main body, the inner cover having a cover plate and a drinking spout on the cover plate covering an upper opening of the receptacle main body;
   an outer cover being removably applied to the inner cover to cover the cover plate; and
   a water-sealing member disposed between the outer cover and the inner cover so as to prevent spilling of contents of the receptacle when tilted in any direction.

2. The drinking receptacle according to claim 1, wherein the cover plate is slanted.

3. The drinking receptacle according to claim 1, wherein the covers have heat-insulating function.

* * * * *